United States Patent [19]
Lindemer et al.

[11] 3,717,582
[45] Feb. 20, 1973

[54] METHOD FOR REDUCING THE OXYGEN IN CERTAIN ACTINIDE OXIDES TO LESS THAN STOICHIOMETRIC LEVELS

[75] Inventors: Terrence B. Lindemer; Ronnie A. Bradley, both of Oak Ridge, Tenn.

[73] Assignee: The United States of America as represented by the United States Atomic Energy Commission

[22] Filed: April 21, 1971

[21] Appl. No.: 136,254

[52] U.S. Cl. ............................252/301.1 R, 423/251
[51] Int. Cl. ..............................................C01g 56/00
[58] Field of Search...252/301.1 R; 23/344, 345, 355

[56] References Cited

UNITED STATES PATENTS

| | | | |
|---|---|---|---|
| 3,462,371 | 8/1969 | Robertson | 252/301.1 |
| 3,374,178 | 3/1968 | May et al | 252/301.1 |
| 3,354,044 | 11/1967 | Robertson | 252/301.1 X |

OTHER PUBLICATIONS

Volpe et al., Kinetics of the Reproduction of Uranium Oxides by Carbon Monoxide and by $H_2$ "Nuc. Sci. Abs.," Vol. 16, No. 21, Abs. No. 28913, p. 3783, 1962.
Gaskin et al., Thermodynamic Characteristics of the Reduction of Uranium Oxides..., "Nuc. Sci. Abs.," Vol. 16, No. 18A, 1962, Abs. No. 24187, p. 3191.
Jacobson, "Encyclopedia of Chemical Reactions," Vol. II, 1968, p. 355.

Primary Examiner—Carl D. Quarforth
Assistant Examiner—R. L. Tate
Attorney—Roland A. Anderson

[57] ABSTRACT

The oxygen content of actinide oxide nuclear reactor fuels is reduced to a value less than stoichiometric (oxygen-to-metal atomic ratio less than two, i.e., $MO_{2-x}$) for inhibiting corrosion or pressurization of the cladding used about the fuel. Actinide oxide particles, e.g., uranium-plutonium oxide particles, with an oxygen-to-metal atomic ratio of about two or greater ($MO_{2+x}$) are disposed in close proximity to carbon and contacted with carbon monoxide while at a temperature in the range of 700°–2,000°C. The CO effects diffusion of oxygen from the particles in the form of oxygenated CO, e.g., $CO_2$, to the carbon where the $CO_2$ reacts to form CO. By controlling the pressure of the CO and the temperature, a CO-to-$CO_2$ ratio is provided to fix the oxygen-to-metal ratio of the oxide at the desired substoichiometric value.

5 Claims, No Drawings

METHOD FOR REDUCING THE OXYGEN IN CERTAIN ACTINIDE OXIDES TO LESS THAN STOICHIOMETRIC LEVELS

The present invention relates generally to a method of treating nuclear reactor fuel particles of an actinide oxide such as uranium-plutonium oxide, thorium-plutonium oxide, and plutonia to selectively reduce the oxygen content thereof to desired substoichiometric values. This invention was made in the course of, or under, a contract with the U. S. Atomic Energy Commission.

Certain actinide oxides such as uranium-plutonium oxide ($UPuO_2$) particles are useable as nuclear reactor fuels especially when sintered and encased within suitable cladding material such as stainless steel tubing or pyrolytic carbon coatings. These nuclear fuel oxides with a small excess of oxygen above stoichiometric $UPuO_2$ sinter and densify more easily at high temperatures than do oxides with an oxygen content of exact stoichiometry, i.e., $MO_2$, or oxides with substoichiometric oxygen content. However, oxides having oxygen content equal to or greater than stoichiometric suffer a drawback when used in nuclear reactor fuel elements in that the oxides are corrosive to the metal cladding since the oxygen potential is sufficient for the formation of oxides with various metals present in the cladding material. Consequently, the fabrication difficulties notwithstanding, in certain nuclear reactors, such as the Liquid Metal Fast Breeder Reactor, it is important to have substoichiometric oxygen in the uranium-plutonium oxide fuel. The literature shows that substoichiometry is achieved by reducing the plutonium oxide component of the uranium-plutonium oxide to $PuO_{2-x}$; the uranium oxide component remains at $UO_2$. The use of such fuel is also desirable since the oxygen resulting from the oxidation of the fuel due to burnup is maintained at a low oxygen potential so as to accommodate burnup. Satisfactory results may be obtained by using hypostoichiometric fuel having an oxygen-to-metal atomic ratio corresponding to $MO_{2-x}$, where $x$ is in the range of more than 0.0 up to about 0.5.

Historically, substoichiometric or hypostoichiometric uranium-plutonium oxide, plutonium oxide, or thorium-plutonium oxide fuel was prepared by heating $MO_2$ or $MO_{2+x}$ in hydrogen to reduce the oxygen content to the desired level. In one such previous method, a gaseous stream of argon — 4 volume percent hydrogen is passed over the oxide in a tube furnace with the hydrogen being partially oxidized by the uranium-plutonium oxide to reduce the oxide while forming water vapor. In producing the hypostoichiometric fuel, only a small fraction of the hydrogen is converted to water vapor by the oxide because the thermodynamics of the plutonium oxide component of the $MO_2$ lead to the maintenance of relatively high $H_2$-to-$H_2O$ ratios, up to 1,000,000 to 1. With this ratio at 100 to 1, 100 volumes of hydrogen would be required to remove one volume of $H_2O$. The time for reduction by this particular method is inversely proportional to the flow rates of hydrogen and directly proportional to the total weight of plutonium oxide present in the furnace. On the other hand, the reduction time for producing substoichiometric oxide is not dependent on the amount of uranium oxide or thorium oxide present in the oxide fuel. This has been demonstrated in several other experiments for the reduction by argon—4 percent hydrogen to produce substoichiometric compositions, including $(U_{0.8}Pu_{0.2})O_{2-x}$, $(U_{0.75}Pu_{0.25})O_{2-x}$, where $x$ ranges between 0.005 and 0.1, $PuO_{1.80}$, $PuO_{1.89}$, and $(Th_{0.75}Pu_{0.25})O_{1.975}$. The latter two oxides were reduced side-by-side in the same furnace at the same time and the analysis of the results demonstrated that the plutonium oxide was substoichiometric to the same degree in each of the two systems while the thorium oxide in the latter remained stoichiometric, i.e., $ThO_2$.

In another previous method employing hydrogen the oxide is intermingled with titanium or zirconium pieces in a crucible of the same material. The water formed during the reduction of the oxide is reduced to hydrogen by the titanium or zirconium with the oxygen from the water going to form a titanium or zirconium oxide. This technique does not require flow of the hydrogen but in a variation thereof a stream of argon or nitrogen mixed with 4–8 volume percent hydrogen is passed over the oxide to effect the reduction. The thermodynamics of these techniques are not well understood and it is not presently possible to accurately determine the limiting oxygen-to-metal ratio of the uranium-plutonium oxide at the end of the reaction time. Hydrogen reduction processes as above described are time dependent rather than equilibrium controlled so as to present control difficulties. Further, in a time dependent process it is not possible to provide uniform oxygen-to-metal ratios on a particle-to-particle basis in the same batch unless the oxide particles are of uniform size and shape. Also, impurities may deposit on the surface of the oxide.

It is the aim or primary objective of the present invention to selectively reduce the oxygen content in actinide oxides of the uranium-plutonium oxide and thorium-plutonium oxide systems and plutonia to desired substoichiometric values by employing a method which obviates or substantially minimizes the shortcomings or drawbacks suffered by previously known oxygen reducing techniques using hydrogen such as described above. The present method comprises the reduction of these oxides by carbon monoxide in the presence of free carbon to establish a carbon monoxide-carbon dioxide-carbon ($CO$-$CO_2$-$C$) system wherein the diffusion of oxygen in an oxygenated form of CO, i.e., $CO_{1+y}$ (referred to herein as $CO_2$ for convenience of description), from the oxide reacts with the carbon for form CO which maintains the desired CO-to-$CO_2$ ratio and system equilibrium. The pressure of the CO and the temperature are preselected to provide an ultimate CO-to-$CO_2$ ratio which effects a specified oxygen reduction in the uranium-plutonium oxide of known oxygen content.

Other and further objects of the invention will be obvious upon an understanding of the illustrative method about to be described, or will be indicated in the appended claims, and various advantages not referred to herein will occur to one skilled in the art upon employment of the invention in practice.

The description below is directed to reducing uranium-plutonium oxide for the purpose of brevity. However, it is to be understood that another actinide— namely, thoria—could be used in place of the uranium oxide in this oxide mixture with equally favorable results due to the similarity of the chemical properties of these two actinides as is well known. Thorium-plutonium oxide having th-to-Pu atomic ratios corresponding to those of the uranium-plutonium oxide described below may be satisfactorily treated. Also, if desired, the oxygen content of plutonium oxide ($PuO_{2+x}$) may be reduced to selected substoichiometric levels by employing the method of the present invention.

Generally, the present invention relates to a method for reducing the oxygen-to-metal atomic ratio in uranium-plutonium oxide to provide the latter with an oxygen content at a desired substoichiometric level. The reduction of the oxygen in the oxide is effected by contacting the oxide with CO in the presence of free carbon in a furnace or reaction vessel at a temperature in the range of 700°–2,000°C. The CO reacts with the oxygen in the oxide to form $CO_2$ which, in turn, reacts with the carbon to form CO for establishing a $CO-CO_2-C$ system and sustaining the reduction reaction until the $CO$-to-$CO_2$ ratio at the oxide surface is equal to that established by the equilibrium of the following reaction:

$$C + CO_2 \rightarrow 2CO$$

Uranium-plutonium oxide particles or pellets having a Pu/Pu + U atomic ratio in the range of 0.01 to 0.99 and an oxygen-to-metal atomic ratio in the range of about 2.0 to 2.4, i.e., $MO_{2.0}$ to $MO_{2.4}$, may be satisfactorily reduced to substoichiometric oxygen-to-metal ratios in the range of less than 2.00 to 1.50. Further, if desired, uranium-plutonium oxide bodies initially having a substoichiometric oxygen content, say in the order of approximately $MO_{2.00}$ to $MO_{1.94}$, may be treated to further decrease the oxygen content.

The carbon monoxide is preferably admixed with a suitable carrier of inert gas such as helium or argon in a concentration sufficient to assure that adequate carbon monoxide is introduced into the furnace to effect the desired reduction and also inhibit the formation of carbides. Satisfactory results have been achieved by using a gas mixture of an inert gas with about 8–12 volume percent CO. With CO concentrations in this range the relative pressure of the CO in the gaseous mixture is more readily maintained at desired levels during the reaction while insuring the presence of adequate CO to effect a uniform contacting and reaction with all the uranium-plutonium oxide bodies present in the furnace. While the range of 8–12 volume percent is preferred for the reduction CO in concentrations in the range of 0.1 to 100 volume percent may be employed.

The free-carbon employed in the method for converting the $CO_2$ to CO as described above may be provided by any suitable carbonaceous, i.e., carbon or graphite, structure or structures. For example, the oxide bodies may be disposed between and in a contiguous relationship with two plate-like structures of carbon or a relatively massive carbon block may be provided with appropriate oxide-body receiving apertures. Alternatively, the carbon may be provided by mixing carbon particles in an easily separated size range with the oxide bodies. In any event, it is somewhat critical to the success of the method to have carbon sufficiently close to each oxide body to effect the conversion of the $CO_2$ diffused from the surface of the oxide body to CO. The diffusion of the $CO_2$ from the oxide to the carbon is observed to be the slowest process step in the method with the time required for the diffusion and the quantity of $CO_2$ converted being dependent upon the width of the gap or space between the carbon and the oxide. Accordingly, in order to insure sufficient $CO_2$ conversion within a practical duration the space between the oxide and the carbon is preferably maintained in a range from touching to about 0.04 inch and in no case more than about 0.1 inch since the desired conversion of the $CO_2$ decreases significantly with increases in the separation between the oxide and the carbon.

The pressure of the CO and the temperature control the reduction of the oxide so as to provide a predetermined minimum oxygen-to-metal ratio or oxygen potential of the oxide which can not be exceeded regardless of the reduction time and carbon content of the oxides. In other words, by regulating the temperature and the pressure of the CO within selected ranges, a desired oxygen-to-metal ratio can be established in the oxide. By employing a CO pressure within the range of about 0.01 to 10.0 atmospheres and a temperature in the range of about 700°–2,000°C. the oxide can be reduced until a predetermined substoichiometric oxygen level corresponding to $MO_{2-x}$ is attained with no further reduction occurring due to achieving a $CO-CO_2-C$ system equilibrium at this particular oxygen-to-metal ratio. The table below is illustrative of the control different CO pressures and temperatures have upon the reduction of $(U_{0.8}Pu_{0.2})O_2$ pellets having a radius of 0.3 cm and a height of 0.6 cm. The gap between the pellets and the free carbon averaged 0.025 cm.

TABLE

| CO Pressure | Temp. (°C) | Oxygen-to-Metal Ratio After Reduction (O/M) | time (hr.) |
| --- | --- | --- | --- |
| 1.0 | 1250 | 1.99 | 0.1 |
| 1.0 | 1425 | 1.96 | 0.3 |
| 1.0 | 1625 | 1.93 | 1.0 |
| 1.0 | 1750 | 1.90 | 2.0 |
| 0.1 | 1100 | 1.99 | 1.0 |
| 0.1 | 1275 | 1.96 | 10.0 |
| 0.1 | 1400 | 1.93 | 40.0 |
| 0.1 | 1525 | 1.90 | 75.0 |

The closer the oxide is to the carbon the shorter the reaction time. Also, increasing the CO pressure and/or the temperature decreases the reaction time. The reaction time is dependent only on the geometrical characteristics and the plutonium oxide content of the individual oxide body and is essentially independent of the amount of uranium oxide present and of the total number and weight of oxide bodies being reduced in the furnace as long as each body is contiguous to carbon. This relationship is contrary to the aforementioned hydrogen reduction techniques in that the reaction times in the latter are dependent on the total weight of plutonium oxide present in the furnace.

In order to provide a better understanding of the method of the present invention as illustrative example relating to the reduction of uranium-plutonium oxide bodies is set forth below.

EXAMPLE

A 1.0-inch diameter by 2.0-inch long carbon cylinder was split lengthwise and six 0.25-inch diameter by 0.25-inch deep holes were drilled in each half at locations that provided alignment of the holes when the cylinder was reassembled. Six 90 percent dense, 0.195-inch diameter by 0.220 to 0.230-inch long $(U_{0.75}Pu_{0.25})O_{1.996}$ pellets containing <100 ppm carbon were placed in the carbon cylinder, one in each set of the matching holes. The loaded cylinder was placed in an $Al_2O_3$ tube furnace and an argon—10 percent CO mixture passed through the furnace at a flow rate of 0.5 l/min. to maintain the CO at a partial pressure of 0.1 atmosphere during the reduction. Four runs were conducted under the above conditions at temperatures of 1,350°C., 1,450°C., and 1,550°C. for a duration of 8 hours and at 1,450°C. for a duration of 62 hours. The results of the runs are listed below.

| Run No. | Temp. (°C) | Time (hr.) | Final O/M* | Predicted O/M |
|---|---|---|---|---|
| 1 | 1350 | 8.0 | 1.979 | 1.981 |
| 2 | 1450 | 8.0 | 1.960 | 1.960 |
| 3 | 1550 | 8.0 | 1.930 | 1.931 |
| 4 | 1450 | 62.0 | 1.938 | 1.931 |

* Three analyses per batch; error of O/M ±0.011, 95% confidence interval.

While the above example relates to the use of a carbon body suitably configured for housing the oxide particles, it is to be understood that carbonaceous plates or particles as described above can be satisfactorily employed. Also, a fluidized bed of carbon and oxide particles may be formed by using a carbon monoxide-inert gas mixture as the fluidizing medium.

It will be seen that the present invention provides a method for reducing the oxygen content in uranium-plutonium oxide, thorium-plutonium oxide, and plutonium oxide bodies in a manner improved over those employing hydrogen as the reductant. The CO pressure and temperature could be selectively varied during a reduction operation to increase or decrease the reaction time. Also, the oxide bodies upon completion of the reaction may be subjected to vacuum or other gas mixtures at temperatures less than the reaction temperature for effecting the removal of included gases from the oxide product.

What is claimed is:

1. An improvement in the method for reducing the oxygen content in actinide oxides selected from the group consisting of plutonium oxide and mixtures thereof with uranium oxide and thorium oxide to preselected substoichiometric values by heating particles of one of said group of actinide oxides to an elevated temperature and contacting the particles with a reducing gas; said improvement comprising disposing each of the particles in a contiguous relationship with carbon, heating the particles to a temperature in the range of about 700° to 2,000°C., contacting the particles with carbon monoxide to reduce the oxygen content in said particles while forming carbon dioxide which reacts with said carbon to form carbon monoxide, and preselecting the pressure of said carbon monoxide and the temperature in said range for reducing the oxygen content of said particles to a predetermined value established when the oxygen potential of said particles is equal to that provided by the reaction $C + CO_2 \rightarrow 2CO$.

2. The method of claim 1, wherein the pressure of the carbon monoxide is in the range of 0.01 to 10.0 atmospheres, the particles of the uranium oxide-plutonium oxide mixture have an oxygen-to-metal ratio in the range of 2.4 to 1.94 prior to the reduction, and wherein the particles of the uranium oxide-plutonium oxide mixture have an oxygen-to-metal ratio in the range of less than 2.00 to 1.50 subsequent to the reduction.

3. The method of claim 2, wherein the carbon monoxide is admixed with an inert gas and comprises 0.1 to 100 volume percent of the mixture.

4. The method of claim 2, wherein the carbon is disposed within the range of 0.0 up to 0.1 inch from each of said particles.

5. The method of claim 2, wherein the carbon is in particulate form and admixed with said particles to provide said contiguous relationship.

* * * * *